(12) United States Patent
Meseth

(10) Patent No.: US 7,873,136 B2
(45) Date of Patent: Jan. 18, 2011

(54) INJECTION SYSTEM AND ASSOCIATED OPERATING METHOD

(75) Inventor: Johann Meseth, Dieburg (DE)

(73) Assignee: Areva NP GmbH, Erlangen (DE)

( * ) Notice: Subject to any disclaimer, the term of this patent is extended or adjusted under 35 U.S.C. 154(b) by 0 days.

(21) Appl. No.: 12/129,088

(22) Filed: May 29, 2008

(65) Prior Publication Data

US 2008/0285701 A1   Nov. 20, 2008

Related U.S. Application Data

(63) Continuation of application No. PCT/EP2006/011097, filed on Nov. 20, 2006.

(30) Foreign Application Priority Data

Nov. 29, 2005 (DE) .................. 10 2005 057 249

(51) Int. Cl.
G21C 9/00 (2006.01)

(52) U.S. Cl. .................. 376/282; 376/283; 376/307; 376/277

(58) Field of Classification Search .................. 376/282, 376/283, 307, 277
See application file for complete search history.

(56) References Cited

U.S. PATENT DOCUMENTS

| 3,417,815 | A | * | 12/1968 | Van Den Honert | ..... 165/104.25 |
| 3,722,578 | A | * | 3/1973 | Frei et al. | ..... 165/60 |
| 4,021,301 | A | | 5/1977 | Frei | |
| 4,050,983 | A | * | 9/1977 | Kleimola | ..... 376/283 |
| 4,124,067 | A | * | 11/1978 | Bonnet et al. | ..... 165/104.32 |
| 4,246,069 | A | * | 1/1981 | Dupuy et al. | ..... 376/403 |
| 4,643,871 | A | * | 2/1987 | Fajeau | ..... 376/282 |
| 4,661,312 | A | * | 4/1987 | Schweiger | ..... 376/283 |
| 5,102,616 | A | * | 4/1992 | Gardner et al. | ..... 376/282 |
| 5,130,078 | A | * | 7/1992 | Dillman | ..... 376/219 |
| 5,541,969 | A | * | 7/1996 | Matteson et al. | ..... 376/258 |
| 6,895,068 | B2 | * | 5/2005 | Hartel et al. | ..... 376/283 |
| 2004/0017877 | A1 | | 1/2004 | Hartel et al. | |

FOREIGN PATENT DOCUMENTS

| DE | 1 204 346 B | 11/1965 |
| DE | 2304700 A1 | 8/1974 |
| DE | 198 46 459 A1 | 4/2000 |
| DE | 19846459 A1 | 4/2000 |
| FR | 2 295 535 A1 | 7/1976 |
| WO | 92/01296 A1 | 1/1992 |

OTHER PUBLICATIONS

International Search Report, dated Mar. 9, 2007.

* cited by examiner

Primary Examiner—Rick Palabrica
(74) Attorney, Agent, or Firm—Laurence A. Greenberg; Werner H. Stemer; Ralph E. Locher

(57) ABSTRACT

A feeding system for an absorber liquid containing a neutron poison, in particular for a quick shut-down of a nuclear reactor, has a storage container for the absorber liquid and is configured for high operational reliability with simple construction. In particular, a chemical decomposition of the absorber liquid or corrosion of the container wall of the storage container is to be excluded. For this purpose, the storage container is connected to a pressure container via an overflow line, wherein the pressure container is filled with a motive fluid.

10 Claims, 2 Drawing Sheets

INJECTION SYSTEM AND ASSOCIATED OPERATING METHOD

CROSS-REFERENCE TO RELATED APPLICATION

Figure 1:
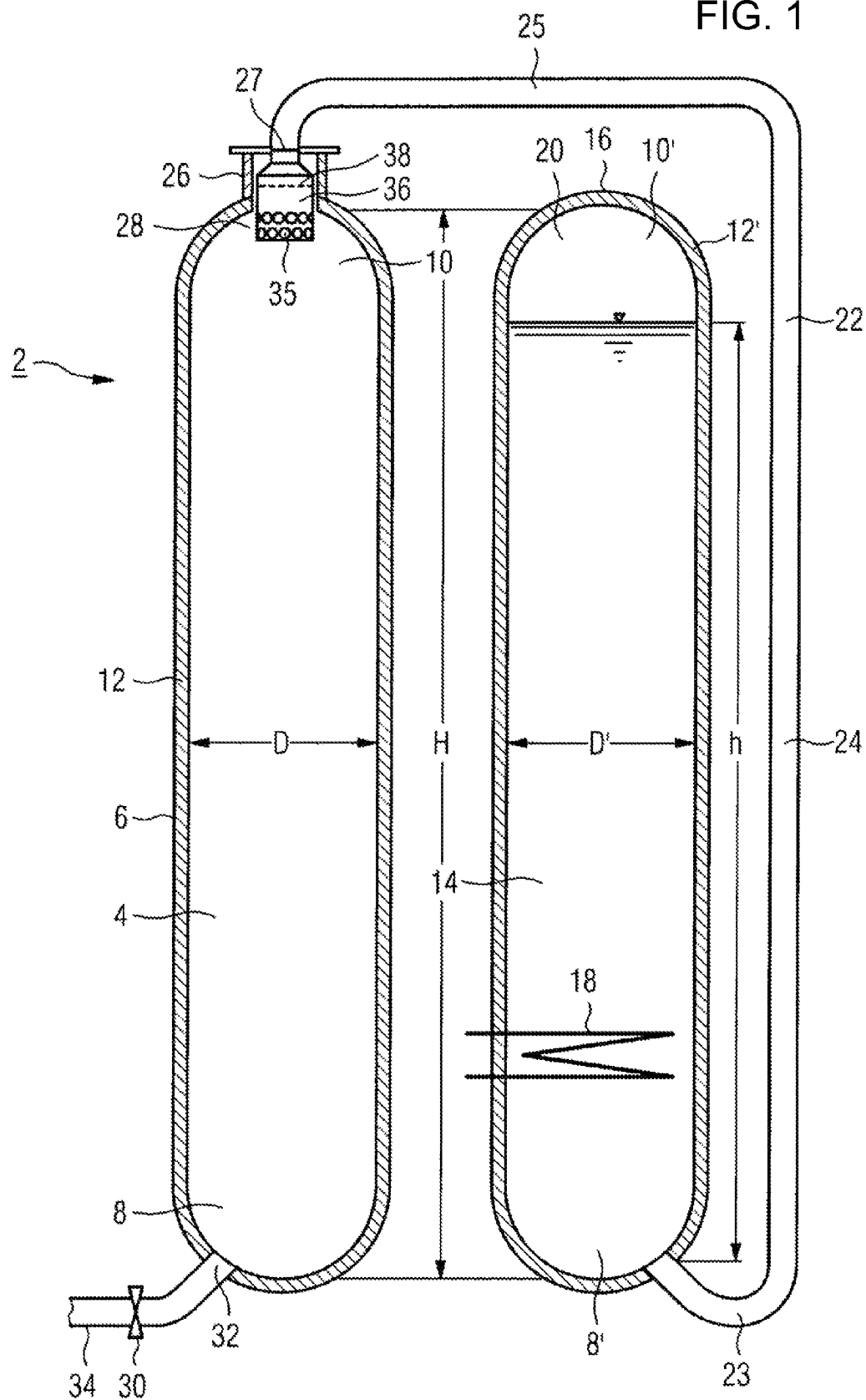

This is a continuation, under 35 U.S.C. §120, of copending international application No. PCT/EP2006/011097, filed Nov. 20, 2006, which designated the United States; this application also claims the priority, under 35 U.S.C. §119, of German patent application No. DE 10 2005 057 249.9, filed Nov. 29, 2005; the prior applications are herewith incorporated by reference in their entirety.

BACKGROUND OF THE INVENTION

Field of the Invention

The invention relates to an injection system for a neutron-poison containing an absorber liquid, in particular for the emergency shutdown of a nuclear reactor, containing a reservoir vessel for the absorber liquid. The invention furthermore relates to a method for making an absorber liquid which is under an operating pressure available in such an injection system. The invention additionally relates to a method for injecting the absorber liquid into a component, which is connected downstream of the reservoir vessel, of a plant, for example into a nuclear reactor. Finally, the invention relates to a nuclear power plant, in particular a boiling-water nuclear power plant containing an injection system of this type.

In nuclear engineering plants, generally an injection system for a so-called absorber liquid is provided as a safety-relevant device. In particular in a boiling-water nuclear power plant it is necessary to make available rapidly acting measures for the emergency shutdown of the reactor core, if for example the drive of the control rods, which are used to control the nuclear reaction in the normal case, fails. For this purpose, introduction of an absorber liquid with a high absorption cross section for neutrons may be provided in the case of an incident. Usually, a boron solution is used for this purpose, wherein the boron, which is in this context also referred to as a neutron poison, effects the absorption of free neutrons. In this manner, the reactor core is, in an incident situation, safely converted to a subcritical state.

By making available the absorber liquid in a reservoir vessel of the injection system at a high pressure, quick initiation of the injection process into the reactor core is possible at all times without the need to first activate active system components which are prone to failure, such as conveying pumps. In order to achieve this passive safety concept, it is therefore necessary to make available the absorber liquid possibly for years at a comparatively high operating pressure.

In accordance with a known concept, the pressure in a reservoir vessel, which is in the form of a pressure accumulator, for the absorber liquid could build up by way of a nitrogen cushion which is located above the liquid. To this end however a complex nitrogen distribution system is necessary. A disadvantage in the case of the high operating pressure which is envisaged according to the design is also the relatively high space requirement for the nitrogen cushion relative to the volume of the absorber liquid. Furthermore, over time the nitrogen dissolves at least partially in the absorber liquid (usually boric acid), with the result that, when liquid is injected, a non-condensable gas is also introduced into the reactor, which among others negatively affects the cooling effect of condensers or emergency condensers.

Published, non-prosecuted German patent application DE 198 46 459 A1, corresponding to U.S. Pat. No. 6,895,068, discloses an injection system for cooling liquid for the emergency cooling of a nuclear reactor, which achieves the necessary operating pressure by heating the cooling liquid, which is stored in a pressure accumulator vessel, using a heating apparatus arranged in the pressure accumulator vessel. In the process, a vapor cushion is formed over the liquid level by evaporating the liquid as a function of the original filling height. If it is needed, that is to say in a reactor incident situation, the vapor cushion pushes the cooling liquid, with simultaneous relief, into the reactor core through a supply line which is connected in the bottom region of the pressure vessel. Arranging the heating apparatus in an upper section of the accumulator vessel effects a temperature layering of the cooling liquid, with the result that, if needed, first comparatively cold and later increasingly hot cooling liquid flows out of the accumulator vessel. The application of this concept in the context of a boron injection system in which a boron-containing liquid is used not only for cooling purposes but primarily for the emergency shutdown of a nuclear reactor is likewise known.

Chemical tests have now concluded, however, that if the absorber liquid, which can advantageously be in the form of a boron solution, is stored for a number of years at the temperatures which are necessary to generate pressure and which are envisaged according to the design within the context of the described concept, a progressive chemical dissociation of the absorber liquid must be expected. Additionally an increased interaction between the absorber liquid and the material of the vessel walls could occur, which under certain circumstances has a disadvantageous effect on the pressure stability or the leak tightness of the reservoir vessel.

SUMMARY OF THE INVENTION

It is accordingly an object of the invention to provide an injection system and an associated operating method which overcomes the above-mentioned disadvantages of the prior art devices and methods of this general type, which injection system ensures, while keeping the configuration simple, permanently high operational reliability and avoids the stated disadvantages of the known systems. Furthermore, a method which is particularly suitable for operating the injection system will be specified—to be precise in each case for the storage period and for the actual injection process.

With the foregoing and other objects in view there is provided, in accordance with the invention, an injection system for a neutron-poison for an emergency shutdown of a nuclear reactor. The injection system contains an absorber liquid, a pressure vessel filled with a propelling fluid, an overflow line, and a reservoir vessel for the absorber liquid. The reservoir vessel is connected, via the overflow line, to the pressure vessel.

With respect to the injection system, the stated object is achieved according to the invention by virtue of the fact that the reservoir vessel is connected, via an overflow line, to a pressure vessel, with the pressure vessel being filled with a propelling fluid.

The invention is here based on the idea that in order to achieve high operational reliability, chemical decomposition of the absorber liquid or other chemical reactions within the absorber liquid or with the walls of the surrounding reservoir vessel and thus possible corrosion of the wall materials should also largely be avoided if the absorber liquid is stored for a relatively long time over a period of several years or even decades. However, since chemical reactivity generally likewise increases with an increase in temperature, the absorber liquid should be stored in a comparatively cool manner, that is to say approximately at room temperature. On the other hand, the absorber liquid in the reservoir vessel should be able to be kept at a prespecified operating pressure for the entire storage period, so that if it is needed, it can be injected into a reactor cooling system or into a reactor core as quickly and completely as possible. The measures which are necessary to generate pressure should here lead to as little influence on the absorber liquid with respect to its other physical or chemical characteristics as possible. This is achieved in the present case by virtue of a pressure vessel with a propelling fluid which is under operating pressure, which pressure vessel is physically separate from the reservoir vessel and is connected to the reservoir vessel via an overflow line which effects pressure equalization. Therefore on the one hand, due to the overflow line, the pressure in the two vessels is always the same, and on the other hand, the physical separation of the two functions "storage of the absorber liquid" and "maintaining a pressure cushion" using a propelling fluid has the consequence that either of the two vessels can be matched and configured, with respect to its chemical compatibility or other characteristics, specifically to the liquid (absorber liquid or propelling fluid) it contains. The interactive influence between the absorber liquid and the propelling fluid is here extremely low due to the physical separation.

Advantageously, the pressure vessel of the injection system has a heating device. In a preferred embodiment, the heating device can be regulated and is configured with respect to its heating output for generating and maintaining an adjustable pressure, wherein preferably the pressure represents the reference variable of the regulation. The actual pressure generation can thus be effected analogously to known systems by virtue of the fact that the pressure vessel is filled up to a prespecifiable filling height (i.e. not completely) with a propelling fluid. Some of the propelling fluid is evaporated by the heating device so that a vapor cushion is formed in the upper region of the pressure vessel and the pressure is maintained by the vapor cushion. The advantage of the vapor cushion is that the operating pressure can very easily be adjusted to, and also maintained at, a desired value, for example the saturated vapor pressure of the propelling fluid. Since the vapor is compressible, a slight temperature increase does not lead to an overproportional pressure increase, as inevitably occurs in a pressure accumulator vessel, for example, which is filled completely with an incompressible liquid. Overall, a known and already proven technology together with the associated know-how can therefore be used for the pressure generation, by which the emergency injection system according to the novel concept can be realized particularly simply and cost-effectively. In particular, if the overflow line, which will be described in more detail below, is configured and dimensioned accordingly, a largely thermal decoupling of reservoir vessel and pressure vessel is ensured with the result that the propelling fluid can also be stored under an operating temperature which is high as compared to the absorber liquid, to the extent that this is expedient for simple generation and maintenance or regulation of the operating pressure, or desired for reasons of other considerations.

In a preferred development, the overflow line, which is provided for pressure equalization and for guidance of the propelling fluid, connects the bottom region of the pressure vessel to the ceiling region of the reservoir vessel. In other words, the connector, which is provided at the pressure vessel, of the overflow line is arranged in a lower wall section near the vessel bottom. The other end of the overflow line issues on the side of the reservoir vessel in an upper section of the vessel wall. In particular, this connector can also be guided through a ceiling of the reservoir vessel, which is in the form of a dome. Preferably, the overflow line has in the region of its end, which faces the pressure vessel, a lower partial section which is guided in the manner of a siphon and has a low point which lies below the bottom of the pressure vessel. That end of the overflow line which is connected to the pressure vessel, that is to say that end which is located at the entrance with respect to the direction of flow during the injection process, is therefore in the form of a downpipe piece near the connector. At the (exit) side, which faces the reservoir vessel, the overflow line preferably has an upper partial section with a high point which is arranged above the ceiling of the reservoir vessel, with the result that here on the connector side a downpipe piece is likewise provided. The lower and upper partial sections of the overflow line are preferably connected to one another by a nearly vertical riser piece.

This type of line guidance is extremely advantageous for the already mentioned thermal decoupling of the fluids which are stored in the pressure vessel and in the reservoir vessel, respectively, since in particular the lower siphon-type partial section is used to largely suppress convective heat flow or heat conduction to the reservoir vessel (in particular due to the downpipe pieces). The line arrangement also has the advantage that when the injection system is activated, first cooler, liquid propelling fluid from the bottom region of the pressure vessel, later hot, liquid propelling fluid and only then vaporous propelling fluid, which originally forms the vapor cushion in the ceiling region of the pressure vessel, flows over into the reservoir vessel for the absorber liquid. In this manner, the walls of the reservoir vessel are comparatively gently preheated when the propelling fluid enters. This reduces the condensation of the propelling fluid vapor, which would otherwise very quickly heat the previously cold walls of the reservoir vessel. A temperature shock is thus avoided. Additionally, the vapor pressure decreases comparatively slowly during the injection procedure due to the preheating effect caused by the liquid propelling fluid. Even after a large part of the absorber liquid has already been introduced into the reactor, sufficient residual pressure is therefore left to completely displace the absorber liquid from the reservoir vessel.

Preferably, an outflow opening provided for the on-demand removal of absorber liquid, for example in the form of an outlet connection provided with a shut-off valve, is arranged in the bottom region of the reservoir vessel. The exit of the absorber liquid is here supported by the hydrostatic pressure of the liquid column in the reservoir vessel.

In a preferred embodiment, the pressure-loaded components of the injection system, that is to say in particular the pressure vessel, the reservoir vessel and the overflow line, are configured for an operating pressure of more than 100 bar, in particular for an operating pressure of approximately 150 bar. This corresponds to a pressure value which includes sufficient contingency reserves and is particularly expedient for use as emergency injection system in a nuclear power plant.

In order to generate and maintain the desired operating pressure which preferably corresponds to the saturated vapor pressure of the propelling fluid, the propelling fluid is heated, with matching to the provided geometry of the pressure vessel, to an operating temperature of over 300° C., in particular to about 340° C. In another advantageous refinement, the pressure vessel is therefore also configured in terms of its material selection for a permanent provision of pressurized propelling fluid with such a high temperature.

The reservoir vessel for the absorber liquid does not need to fulfill any particular requirements in terms of temperature resistance in the regular case, i.e. during the storage period or the standby time until a reactor incident, since the absorber liquid is merely at approximately room temperature. The overflowing hot propelling fluid causes a comparatively short temperature load only during the actual injection procedure. The reservoir vessel can therefore be made of a material which is of a lower quality with respect to its heat resistance than the pressure vessel and is thus cheaper.

The injection system is, due to its design principles (in particular passivity and longevity), suitable particularly for making available an absorber liquid for on-demand emergency shutdown of a nuclear power plant. To this end, the reservoir vessel of the injection system is preferably dimensioned such that it can hold a quantity of absorber liquid which is sufficient for shutting down a nuclear reactor. The pressure vessel is preferably dimensioned in this case such that it can hold a quantity of propelling fluid which is sufficient to completely displace the absorber liquid from the reservoir vessel, with this quantity being dependent inter alia on the desired operating pressure and the desired operating temperature and on the type of fluids.

An aqueous boron solution has proven particularly suitable as the absorber liquid for emergency shutdown and/or emergency cooling of a nuclear reactor. In particular, an approximately 13% boron solution, for example a sodium pentaborate solution, can be provided as the absorber liquid. As opposed to other conceivable absorber liquids with a high absorption cross section for neutrons, a boron solution is distinguished at least at temperatures which are not too high by a long shelf life and relatively good chemical compatibility with respect to the walls of the reservoir vessel, which are usually made of steel.

Water is preferably provided as an easy-to-store propelling fluid which has particularly good compatibility with the boron solution. In the evaporated form, i.e. in the vapor cushion of the pressure vessel, the water is present as water vapor.

The object relating to the method for making available an absorber liquid under an operating pressure is achieved by virtue of the fact that the operating pressure is generated by heating the propelling fluid in the pressure vessel of the injection system. The propelling fluid is here advantageously stored in a lower region of the pressure vessel in liquid form. The action of the heating device which can preferably be in the form of an electric heating device or of a heat exchanger system causes some of the quantity of liquid to evaporate, so that a vapor cushion is formed in the upper region of the pressure vessel. In a particularly preferred refinement, the heating device is a constituent part of a regulating system and is additionally dimensioned with respect to its achievable heating output to be sufficiently large so that a vapor cushion with an adjustable, temporally constant pressure can be permanently maintained. If a vapor cushion is present, the adjustment and maintenance of the desired pressure value can be effected significantly more easily in comparison with a pressure accumulator which is completely filled with liquid.

In case of necessity, the absorber liquid which is made available under an operating pressure is injected into a component, which is connected downstream of the reservoir vessel, of a plant, in particular into a nuclear reactor. Such a case of necessity exists for example if the control elements or control rods, which are normally provided to control the neutron flow, cannot be inserted into the core due to a fault in the drive or in the actuation. In this case, a valve or a shut-off apparatus of the reservoir vessel is opened, so that the pressurized absorber liquid is introduced via a connection line into the reactor pressure vessel. Preferably, due to the relief of the vapor cushion, which is formed from evaporated propelling fluid, in the pressure vessel, first liquid and then vaporous propelling fluid flows into the reservoir vessel, wherein the absorber liquid which was originally present therein is more and more displaced. To the extent that water or water vapor is used as the propelling fluid, thus first preferably hot water, then saturated water and finally saturated vapor flows from the pressure vessel into the reservoir vessel, with the vessel pressure decreasing at the same time. A temperature shock on the walls of the reservoir vessel is avoided by this advantageous sequence.

In another advantageous development, the overflow speed of the propelling fluid during such an injection process is adjusted such that although on the one hand as high a throughput per unit time as possible is achieved and thus the reactor can be shut down quickly, on the other hand mixing of the propelling fluid with the absorber liquid is substantially prevented. Such a value of the overflow speed can be adjusted for instance by way of a suitable throttle device or can be predefined already by way of the dimensioning of the overflow line itself. The advantage of the injection method carried out in this manner is that the temperature layering, which is established due to the density differences in the reservoir vessel, of cold absorber liquid and, above the latter, hot propelling liquid remains. Therefore only cold absorber liquid is introduced into the reactor core. Once the absorber liquid is fully displaced from the reservoir vessel, the pressure in the injection system has advantageously decreased so strongly that the flow processes stop automatically. In this way, the hot propelling fluid is kept away from the reactor core.

Expediently, the injection system is a constituent part of a nuclear power plant. It is preferably in the form of a so-called poison injection system which can be used to shut down the nuclear reaction in a boiling-water reactor if, in the case of a serious incident situation, the control rods can no longer be inserted into the reactor core. Alternatively, or additionally, provision could be made for the fluid which is made available at high pressure by the injection system to be used for the emergency driving of the control rods themselves, by way of which a hydraulic drive system is realized which is redundant with respect to the usually electric driving of the control rods. The liquid stored in the reservoir vessel of the injection system should in this case therefore be regarded as drive liquid for the control rods.

In another alternative, the injection fluid is supplied in an expedient manner to an emergency cooling system of a pressurized-water nuclear power plant as emergency cooling fluid (usually emergency cooling water). The injection system is therefore preferably used as a so-called accumulator for the emergency cooling water in a pressurized-water nuclear power plant.

The advantages achieved with the invention are in particular that, by physically separating the functions "liquid storage" and "pressure generation" in the form of a reservoir vessel and a pressure vessel which are in each case provided for holding purposes, an effective chemical and thermal decoupling of the absorber liquid from the propelling fluid can be achieved, wherein the overflow line which connects the two components of the injection system ensures that the absorber liquid is stored at operating pressure such that it can be removed at any time. Such a configuration of an injection system, in which in particular heating of the reservoir vessel for the absorber liquid is prevented, provides a particularly high operational reliability also for permanent operation or standby mode over many years since a chemical reaction of the absorber liquid with the reservoir vessel and thus also a chemical dissociation of the absorber liquid is kept extremely low.

Other features which are considered as characteristic for the invention are set forth in the appended claims.

Although the invention is illustrated and described herein as embodied in an injection system and an associated operating method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEW OF THE DRAWING

Figure 2:
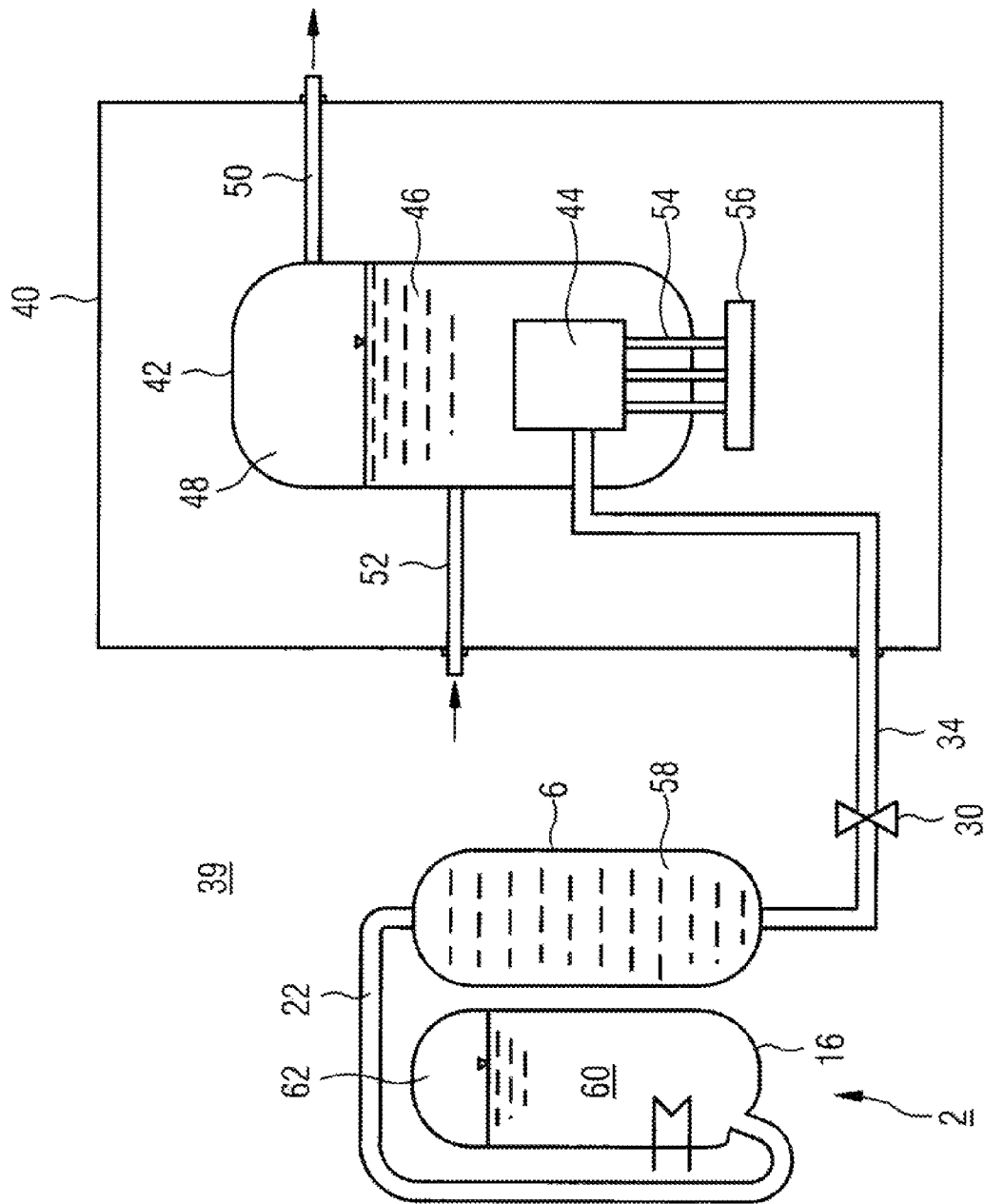

FIG. 1 is a diagrammatic, illustration of an injection system for an absorber liquid according to the invention; and FIG. 2 is a diagrammatic, illustration of a detail from a boiling-water nuclear power plant with an injection system according to FIG. 1 for emergency shutdown of the reactor core.

DETAILED DESCRIPTION OF THE INVENTION

Identical parts are provided with the same reference symbols in both figures. Referring now to the figures of the drawing in detail and first, particularly, to FIG. 1 thereof, there is shown an injection system 2 which is used to make available and to inject in an on-demand manner pressurized absorber liquid 4 into a component, which is connected downstream of the injection system 2, of a plant, in particular into a nuclear reactor. In the exemplary embodiment, the absorber liquid 4 is a 13% sodium pentaborate solution which, in the case of an incident in a boiling-water reactor (not illustrated further here), is to be introduced into the reactor core, wherein the boron atoms of the boron solution capture free neutrons on account of their comparatively high absorption cross section for neutrons. In this way, the reactor can be reliably shut down in a relatively short period of time (approximately 20 seconds after the injection of the absorber liquid 4).

In order to store the absorber liquid 4, a pressure-stable reservoir vessel 6 is provided, which reservoir vessel is completely filled with the absorber liquid 4 during the storage period. Here, the reservoir vessel 6 is an upright cylindrical tank with a bottom region 8 and a ceiling region 10 which are in each case in the shape of a semi-sphere. A structural height H and a diameter D and thus also the volume of the reservoir vessel 6 are matched to the intended use in a nuclear power plant and have, for example, the values H=7.0 m and D=0.8 m. The capacity of the reservoir vessel 6 thus corresponds to the quantity of absorber liquid 4 which is provided for the emergency shutdown of the reactor core. A vessel wall 12 is made from a particularly pressure-stable and corrosion-resistant steel wall of a high-grade steel, for example of an austenitic steel.

In accordance with the configuration of the injection system 2 as a passive safety system, the absorber liquid 4 must be stored permanently under an operating pressure of preferably about 150 bar over the storage period which may last many years, that is to say in standby mode, as it were. The temperature of the absorber liquid 4 here should, however, not substantially exceed room temperature in order to avoid increased reactivity which could lead to corrosion of the surrounding vessel wall 12 and to a decomposition of the boron solution. In the exemplary embodiment, storage of the absorber liquid 4 at a temperature of about 30° C. is therefore envisaged.

Because of the comparatively low temperature of the absorber liquid 4, the injection system 2 is configured for a particularly high operational reliability during the standby mode, wherein furthermore any influence on the absorber liquid 4 due to the measures necessary to generate pressure should, if possible, be avoided. In order to realize the stated temperature and pressure conditions in the reservoir vessel, the generation and maintenance of a pressure cushion, which are based on the evaporation of a propelling fluid 14 and associated with a strong development of heat, are therefore decoupled from the reservoir vessel 6. To this end, a separate pressure vessel 16 is provided which is configured in the exemplary embodiment similarly to the reservoir vessel 6 and also has approximately the same dimensions. The pressure vessel 16 here therefore has the same structural height H and the same diameter D'=D as the reservoir vessel 6. Both vessels are additionally arranged at the same height. While the volume of the pressure vessel 16 is subject to boundary conditions which, as far as possible, are prespecified by the intended use (in particular by the operating pressure to be realized, the quantity of absorber liquid 4 to be displaced and, if appropriate, by further design criteria), there is a far-reaching design freedom with respect to the concrete shape and arrangement of the pressure vessel 16 similar to the case of the reservoir vessel 6.

The pressure vessel 16 is filled in the case of operation up to a filling height h with the liquid propelling fluid 14. The propelling fluid 14, in this case water, is heated by a heating device 18, which can be regulated, and evaporates partially in the process, with the result that a vapor cushion 20 forms over the liquid level, in this case therefore a water vapor cushion, which, owing to its compressibility, effects the actual pressure storage. The regulation of the heating device 18, which is formed for example by electric heating elements or by a heat exchanger system and is preferably arranged in a lower region of the pressure vessel 16, is effected such that approximately constant operating pressure of about 150 bar is maintained over the entire standby time. To this end, provision is made to heat the water located in the pressure vessel 16 to an average temperature of about 340° C. These values correspond to the saturated vapor pressure and the saturated temperature. A vessel wall 12' of the pressure vessel 16 must therefore not only be particularly pressure-stable, but also comparatively heat-resistant. In order to reduce the heat losses (especially on account of heat radiation), the pressure vessel 16 is provided on its outside with a thermal insulation (not illustrated in further detail).

The pressure vessel 16 is, on the medium side, connected via an overflow line 22 to the reservoir vessel 6, by which the same pressure conditions prevail in the entire injection system 2. Here, the overflow line 22 is guided out of the bottom region 8' of the pressure vessel 16 in the manner of a siphon. The overflow line 22 therefore has a lower partial section 23 with a low point which is located below the bottom of the pressure vessel 16. Connected to the lower partial section 23, viewed in the direction of flow of the propelling fluid 14 (with reference to the injection process), is a vertical riser 24 which finally merges into a substantially arched upper partial section 25. The high point of the upper partial section 25 here lies above the ceiling of the reservoir vessel 6. The overflow line 22 is, in the direction of the reservoir vessel 6, guided into a connection flange 26 which projects out of the dome-type ceiling region 10 of the reservoir vessel 6. Due to the pressure exerted by the vapor cushion 20, the liquid propelling fluid 14 completely fills the overflow line 22. Any air cushion which may have originally been present in the overflow line was already displaced during the preceding heating process at approximately 100° C. At a boundary surface 27 between the absorber liquid 4 (boron solution with comparatively high density) and the propelling fluid 14 (water with lower density), the two liquids do not mix owing to the difference in densities. Rather, a layered liquid column is formed there.

Due to the way the line is guided, a convective transport of heat inside the overflow line 22 can, if the line diameter is appropriately dimensioned, be neglected just like the conduction of heat. In other words: the liquid propelling fluid 14, which is located in an issue region 28 to the reservoir vessel 6 or just above in the overflow line 22, has approximately the same temperature as the absorber liquid 4 inside the reservoir vessel 6, that is to say approximately 30° C. The temperature of the fluid in the overflow line 22 rises continuously in the direction of the pressure vessel 16. The absorber liquid 4 is therefore not heated due to the substantially stationary temperature distribution inside the overflow line 22.

If the injection system 2 is activated, a shut-off valve or other shut-off apparatus 30 which has been kept shut up until then is opened so that the pressurized absorber liquid 4 can emerge from an outflow opening 32 arranged in the bottom region 8 of the reservoir vessel 6. Connected to the outflow opening 32 is a connection line 34 to the component which is to be supplied with absorber liquid 4, for example a bypass of a reactor core. The shut-off apparatus 30 can, as shown here, be integrated into the connection line 34 or else directly into the outflow opening 32.

During the injection process, the pressure of the vapor cushion 20, which has previously built up in the ceiling region 10' of the pressure vessel 16, is relieved and in the process pushes the hot water, which is located under the cushion and acts as propelling fluid 14, into the overflow line 22 and then into the reservoir vessel 6. During this process, first the hot water, which is originally in the bottom region 8' of the pressure vessel 16, then the saturated water, which is present directly below the vapor cushion 20, and finally the saturated vapor itself, which forms the vapor cushion 20, flows from the pressure vessel 16 into the reservoir vessel 6, with the vessel pressure decreasing at the same time. When the hot water enters the reservoir vessel 6, its vessel wall 12 is heated comparatively gently, in any case more gently than in the case of a direct entry of hot vapor. This avoids a temperature shock and associated material stresses. Additionally, the vapor pressure does not decrease as quickly as would be the case in a direct condensation of the vapor at the cold vessel wall 12 of the reservoir vessel 6.

The hot propelling fluid 14 flows into the reservoir vessel 6 preferably in a manner such that a swirling or mixing with the cold absorber liquid 4 is avoided and the temperature layering which occurred originally due to the difference in densities therefore remains. That means that there is a relatively sharply defined boundary surface 27 between the cold absorber liquid 4 and the hot propelling fluid 14, which also remains intact over the course of the inflow process and in the process continuously wanders downwards. For this purpose, the issue region 28 of the overflow line 22 into the reservoir vessel 6 has a throttle element 36, provided with a large number of exit nozzles 35 (arranged for example on a cylinder outer surface), for suitably influencing the flow. A screening sheet 38 is also arranged in the throttle element 36.

The injection system 2 with the stated dimensions is suited particularly as a quickly activatable boron injection system in a nuclear power plant, in particular in a boiling-water nuclear power plant. The two pressure vessels connected via the overflow line 22 (reservoir vessel 6 and pressure vessel 16) are in this case comparatively slim and tall, so that the vessel walls 12, 12' can be kept thin. In this case, owing to the quick heating of the reservoir vessel 6 during the injection process, the thermal loads are lower than in the case of a shorter vessel with correspondingly greater wall thickness. Volume conditions which are different from those mentioned above can be more expedient for other intended uses.

FIG. 2 shows a schematic detail from a boiling-water nuclear power plant 39 with an injection system 2 according to FIG. 1. A reactor pressure vessel 42 with a core region 44 is arranged in a containment 40. The reactor pressure vessel 42 is partially filled with a cooling liquid 46. Above the cooling liquid 46, there is vapor 48 which is conducted via a vapor line 50 out of the containment 40 and is guided to a turbine (not illustrated in more detail). Cooled cooling liquid 46 is recycled to the reactor pressure vessel 42 via a line 52. The performance of the nuclear reactor can be regulated by inserting and removing the control rods 54 into and out of the core region 44. The control rods 54 are in this case moved by a drive system 56 which is designed in a redundant manner.

If the incident-free ability to manipulate the control rods 54 is no longer ensured in the case of a serious incident situation, the nuclear reaction can be interrupted by way of injecting boric acid 58 into the core region 44 of the boiling-water reactor (so-called poison injection system). The boric acid 58 is stored under high pressure in the reservoir vessel 6 of the emergency injection system 2 according to FIG. 1. The injection system 2 has for this purpose the pressure vessel 16, which is connected via the overflow line 22 to the reservoir vessel 6 for the boric acid 58 and in which a saturated vapor cushion 62 is produced by heating of water 60.

The injection system 2 and the associated operating method allow preferably in boiling-water nuclear power plants and in particular in the case of incident situations a reliable supply of the absorber liquid 4, in particular boric acid, intended for an emergency shutdown to the reactor core, wherein, during the preceding storage period, corrosion of the reservoir vessel 6 and/or dissociation of the absorber liquid 4 is avoided.

The invention claimed is:

1. An injection system for a neutron poison for an emergency shutdown of a nuclear reactor, the injection system comprising:
    an absorber liquid having an absorption cross section that captures free neutrons;
    a pressure vessel containing a propelling fluid being essentially water;
    an overflow line communicating with a core region of a reactor pressure vessel of a nuclear reactor, the core region being external to said pressure vessel;
    a reservoir vessel storing said absorber liquid at room temperature, said reservoir vessel connected, via said overflow line, to said pressure vessel; and
    an outflow line connected to said bottom region of said reservoir vessel; and
    a shut-off apparatus having a closed position that closes said outflow line and an open position that opens said outflow line thereby causing the absorber liquid to be pushed through said outflow line by the propelling fluid;
    said reservoir vessel being spatially separated from said pressure vessel, and only said overflow line connecting said reservoir vessel to said pressure vessel such that pressure is equalized between said reservoir vessel and said pressure vessel;
    said pressure vessel formed with a ceiling region and a bottom region, said pressure vessel including a heating device configured to heat and partially evaporate the propelling fluid in order to form a vapor cushion located in said ceiling region of said pressure vessel, wherein an un-evaporated portion of the propelling fluid defines a liquid portion located below the vapor cushion;

said overflow line connecting said bottom region of said pressure vessel to said ceiling region of said reservoir vessel, said overflow line including a riser; and said overflow line including a plurality of nozzles discharging the propelling fluid near said ceiling region of said reservoir vessel.

2. The injection system according to claim 1, wherein said bottom region of said pressure vessel has an outflow opening formed therein for removal of said absorber liquid.

3. The injection system according to claim 1, wherein said pressure vessel, said reservoir vessel and said overflow line are pressure-loaded components constructed to operate at a pressure of more than 100 bar.

4. The injection system according to claim 1, wherein said pressure vessel and said heater cooperate such that said propelling fluid is always available at a temperature of more than 300° C.

5. The injection system according to claim 1, wherein said reservoir vessel is dimensioned to hold a quantity of said absorber liquid which is sufficient for shutting down the nuclear reactor.

6. The injection system according to claim 1, wherein said pressure vessel is dimensioned to hold a quantity of said propelling fluid which is sufficient to completely displace said absorber liquid from said reservoir vessel.

7. The injection system according to claim 1, wherein said absorber liquid is an aqueous boron solution stored in said reservoir vessel.

8. The injection system according to claim 1, wherein said pressure vessel, said reservoir vessel and said overflow line are pressure-loaded components constructed to operate at a pressure of approximately 150 bar.

9. The injection system according to claim 1, wherein said pressure vessel and said heater cooperate such that said propelling fluid is always available at a temperature of approximately 340° C.

10. The injection system according to claim 1, wherein said plurality of nozzles discharge the propelling fluid such that the propelling fluid is prevented from mixing with the absorber liquid after the propelling fluid exits said plurality of nozzles.

* * * * *